United States Patent [19]

Karmann et al.

[11] Patent Number: 5,034,986
[45] Date of Patent: Jul. 23, 1991

[54] METHOD FOR DETECTING AND TRACKING MOVING OBJECTS IN A DIGITAL IMAGE SEQUENCE HAVING A STATIONARY BACKGROUND

[75] Inventors: Klaus-Peter Karmann; Achim von Brandt, both of Munich, Fed. Rep. of Germany

[73] Assignee: Siemens Aktiengesellschaft, Munich, Fed. Rep. of Germany

[21] Appl. No.: 479,395

[22] Filed: Feb. 12, 1990

[30] Foreign Application Priority Data

Mar. 1, 1989 [DE] Fed. Rep. of Germany ....... 3906483

[51] Int. Cl.$^5$ .............................................. G06K 9/70
[52] U.S. Cl. ......................................... 382/1; 382/41; 382/48; 358/126
[58] Field of Search ............... 382/41, 48, 1; 358/126; 342/64, 189

[56] References Cited

U.S. PATENT DOCUMENTS

| | | | |
|---|---|---|---|
| 4,133,004 | 1/1979 | Fitts | 358/125 |
| 4,685,146 | 8/1987 | Fenster et al. | 382/54 |
| 4,739,401 | 4/1988 | Sacks et al. | 358/126 |
| 4,849,906 | 7/1989 | Chodos et al. | 364/516 |
| 4,928,176 | 5/1990 | Schmidt et al. | 358/126 |

OTHER PUBLICATIONS

"Moving Object Detection by Temporal Frame Difference Accumulation", Digital Signal Processing—84, V. Cappelini et al., editors, Florence, 1984, pp. 900–907.
"Image Sequence Analysis for Object Tracking", Proceedings of the 5th Scandanavian Conf. on Image Analysis, Stockholm, Jun. 1987, pp. 641–648.
"Obtaining Smooth Optical Flow Fields by Modified Block Matching", 5th Scanadanavian Conf. on Image Analysis, Stockholm, Jun. 2–5, 1987, Proceedings, vol. 2, pp. 529–532, Brandt & Tenger.
"Determining Optical Flow", Horn & Schunck, Artificial Intelligence, vol. 17, pp. 185–203, 1981.

Primary Examiner—Leo H. Boudreau
Assistant Examiner—Andrew W. Johns
Attorney, Agent, or Firm—Hill, Van Santen, Steadman & Simpson

[57] ABSTRACT

A method for detecting and tracking moving objects in a digital image sequence having a stationary background by comparing the image sequence to a calculated background image sequence, whereby a sequence of binary object masks is calculated whose segments reproduce the shapes and positions of the moving subjects, and whereby the motion vectors of the moving objects are calculated by matching these segments. Also, a sequence of background images is calculated by spatially selective and time recursive averaging of the input image sequence in which the moving objects are not contained but in which other modifications of the background that are not caused by moving objects are contained. Further, a sequence of binary object masks is calculated by binarization of the difference image sequence from the input image sequence and the background image sequence using a threshold whose value is used for controlling the spatial selectivity in the calculation of the background image sequence and whose segments are determined together with their sizes and center of gravity positions. Finally, motion vectors of the detected objects are determined by minimization of the squared gray scale value differences averaged over the intersection of the shifted mask segments, whereby differences between the center of gravity vectors of corresponding segments are utilized as start vectors in the minimization.

4 Claims, 2 Drawing Sheets

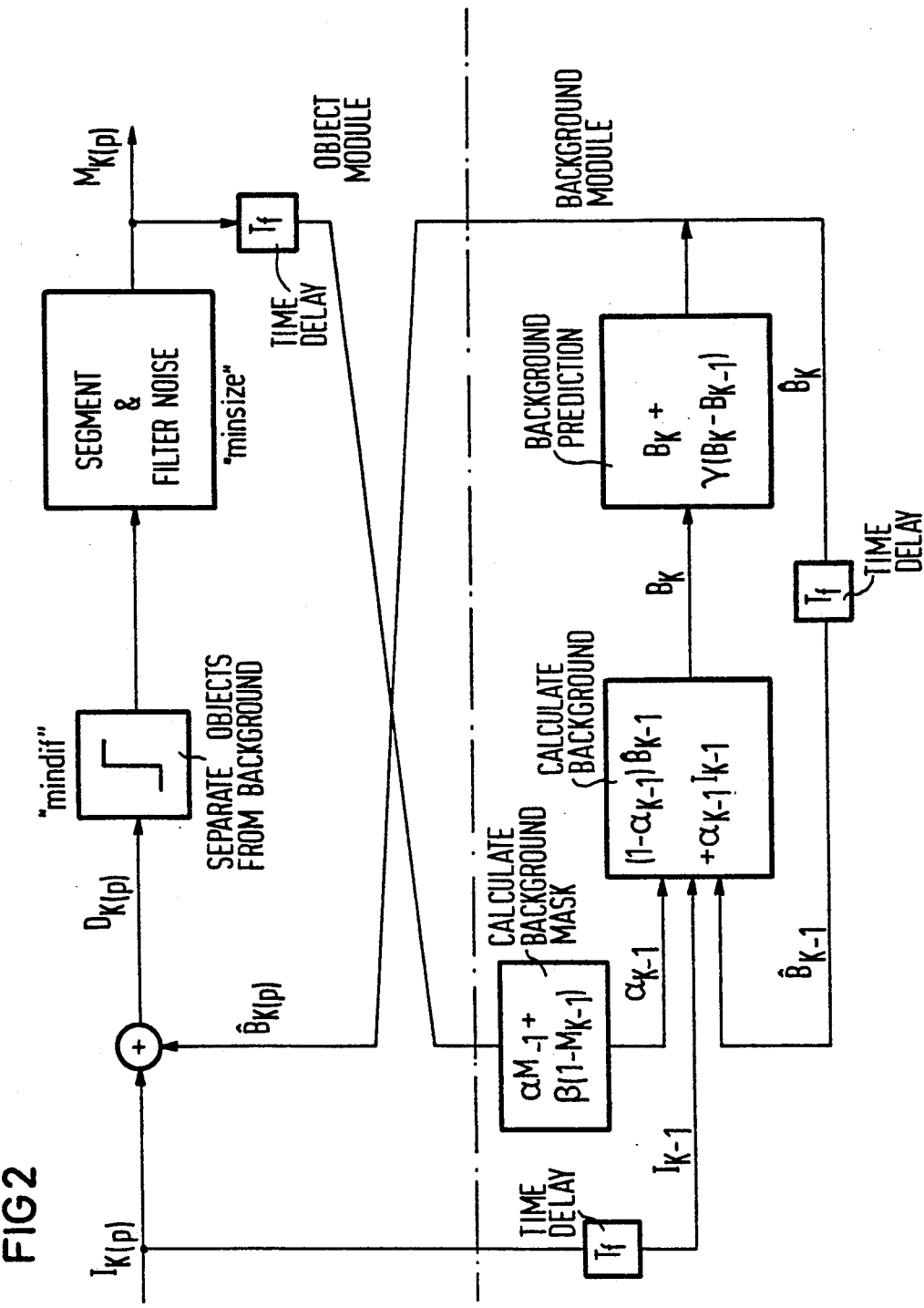

METHOD FOR DETECTING AND TRACKING MOVING OBJECTS IN A DIGITAL IMAGE SEQUENCE HAVING A STATIONARY BACKGROUND

BACKGROUND OF THE INVENTION

The present invention is directed to a method for detecting and tracking moving objects in a digital image sequence having a stationary background.

In various applications of machine vision (scene analysis, autonomous vehicle control, monitoring jobs) it is important to be able to detect moving objects by interpreting a temporal sequence of digital images, to be able to identify their shape and position and to be able to track their motion. This generally is achieved by segmenting an image sequence wherein the segments are grouped to form objects within an image. Objects in various images are identified with one another and the corresponding segment groups are combined to form trajectories. The resulting sequences of segment images and object trajectories can then be made available for further scene analysis evaluation by either a person or an intelligent system.

The following problems must therefore be addressed for recognizing and tracking subjects:

(1) Separating the moving image regions from the stationary background;

(2) Separating the subjects from one another, i.e., a segmentation of the moving image region, so that every moving object can have a group of segments allocated to it; and (3) Correctly allocating the segment groups of the images to the sequence of subject trajectories (correspondence problem).

In addition to the object motions, changes in illumination and various noise sources also contribute to a temporal change of brightness. A practical system for object tracking must be able to distinguish object motions from other dynamic processes. Estimating the motion therefore has a central role in object tracking. Knowledge of the motion parameters of detected objects is also an important prerequisite for a correct combination of object mask segments into objects and for solving the correspondence problem.

Prior art methods for tracking general, independently moving objects can be divided into the following two classes:

Change Detection with Difference Images of Consecutive Images

The methods belonging to this class (P. Spoer, "Moving Object Detection by Temporal Frame Difference Accumulation", in Digital Signal Processing 84, V. Cappellini and A. G. Constantinides, editors, Florence 1984, pp. 900–907 and J. Wiklund, G. H. Granlund, "Image Sequence Analysis for Object Tracking", Proceedings of the 5th Scandanavian Conference on Image Analysis, Stockholm, June 1987, pp. 641–648) are based on the evaluation of difference images from consecutive images of the temporal sequence. These difference images are subjected to a threshold evaluation, from which a binary image corresponding to the threshold decision is produced. Typically, this also contains a residual noise (noisy pixels) that can be eliminated by a suitable filter operation (median filter, low-pass filter, quenching all segments whose size lies below a threshold).

The goal of this procedure is the separation of the moving image regions from the background and the acquisition of object masks whose segments reveal the shape and position of the objects. This type of prior art methods has two problems which generally lead to difficulties:

(1) Even under ideal conditions (complete freedom from noise, objects with high-contrast, extended textures that are clearly distinguished from the background), the segments of the object masks produced in this manner do not have a simple relationship to the plurality of objects and their shapes can not be uniquely reconstructed. Generally, the binary image obtained in this manner corresponds to the combination of two binary images that represent the object positions at two different times.

(2) Regions having low brightness gradients in the interior of the objects cause holes to occur in the corresponding segments of the object masks. A segment can also decompose into a plurality of parts.

(b) Segmenting Motion Vector Fields

A moving object corresponds to an image segment in whose interior a motion vector field is continuous and at whose edge the motion vector field is discontinuous at least at some locations. This situation forms the basis of a number of methods that, proceeding from the images of the sequence, estimate motion vector fields using various methods (A. V. Brandt, W. Tenger, "Obtaining Smooth Optical Flow Fields by Modified Block Matching", the 5th Scandanavian Conference on Image Analysis, Stockholm, June 2-5, 1987, Proceedings, Vol. 2, pp. 529-532 and B. K. Horn, B. G. Schunck, "Determining Optical Flow", Artificial Intelligence, Vol. 17, pp. 185-203, 1981) and subsequently segment these using some suitable continuity criterion (H. Kirchner, "Objektsegmentierung auf der Basis von Verschiebungsvektorfeldern (Object Segmentation based on Motion Vector Fields)", Lehrstuhl fuer Informatik 5, University of Erlangen-Nuernberg, W. Germany, 1987 and W. Tengler, H. Kirchner, A. V. Brandt, "Object Segmentation from Optical Flow Field", presented at the 5th IEEE Workshop on Multidimensional Signal Processing (MDSP), Noordwijkerhout, Netherlands, Sept. 14-16, 1987).

Such a procedure is basically suitable for avoiding the problems connected with the change detection. However, a main drawback of this approach is that knowledge of the object boundaries must be available or assumptions must be made in order to estimate the motion vector fields having the desired continuity properties. According to the concept, however, they are only subsequently acquired with the segmenting of the motion vector fields.

When, in addition to pure translations, the scene also contains objects with nonnegligable rotational motion, standard methods for estimating motion produce unusable results. The segmentation of motion vector fields is therefore not well suited for the analysis of image sequences having rotating objects.

SUMMARY OF THE INVENTION

An objective of the present invention is to provide a method of the type initially cited that, despite a low contrast of images in an image sequence, provides improved noise suppression and improved discrimination between moving objects and temporal changes in the image that do not result from moving objects, particularly modifications due to changes in illumination.

The objective of the present invention is achieved by a method for detecting and tracking moving objects in a digital input image sequence having a stationary background by comparing the input image sequence to a calculated background image sequence. The method has the steps of:

calculating a sequence of background images by spatially selective and time-recursive averaging of the input image sequence, in which sequence of background images the moving objects are not contained but in which other modifications of the background that are not caused by moving objects are contained;

calculating a sequence of binary object masks by binarization of a difference image sequence formed from the input image sequence and the background image sequence using a threshold, the sequence of the binary object masks representing the shapes and positions of moving objects;

using the sequence of binary object masks for controlling the spatial selectivity of the calculation of the sequence of background images;

determining the sizes (areas) and positions of the centers of gravity of segments of the binary object masks; and determining motion vectors of detected objects by minimization of squared gray scale value differences averaged over the intersections of shifted mask segments.

Noise suppression can be carried out in the object masks by using median filters and the background image sequence can also be updated by ongoing images at those locations at which a moving object is not visible. An alternative method for determining the deviation of the gray scale values of two images at a defined location can be used instead of the squared gray scale value differences in the function for a motion estimation. Furthermore, a suitably selected constant can be added to a counter provided in a function for motion estimating and a prediction of the start vectors for the motion estimation can be made by using a Kalman filter.

A measurement model (Kalman filter) can be used for substantially every possible allocation of the segments among neighboring object masks; and the selection of a correct allocation can be undertaken via an evaluation of co-variance matrices of prediction errors, whereby an allocation is preferably selected that minimizes a suitably selected norm of the co-variance matrices of prediction errors.

Two or more background images can be stored in a background memory, or one background image and the difference between two background images can be stored in the background memory. A suitable recursion equation based on the stored images can be used for calculating the background images, which produces the result that gradual brightness and contrast changes do not cause any deviation between a current and a stored background image. Furthermore, weight coefficients $\alpha$, $\beta$ and $\gamma$ used in the calculation can be adaptatively matched to momentary image signal statistics in a location-dependent and time-dependent fashion, such as with Kalman filters or with the known "least mean squares (LMS)" algorithm. Also, the object masks can be acquired in a simplified manner from the difference between a measured image and a background image, namely, for example, without a comparison of intensity values within the object masks of successive images and without the calculation of motion vectors.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures in which like reference numerals identify like elements, and in which:

FIG. 2 is a block diagram having a plurality of function blocks for the implementation of the method.

DESCRIPTION OF THE PREFERRED EMBODIMENT

Figure 1:
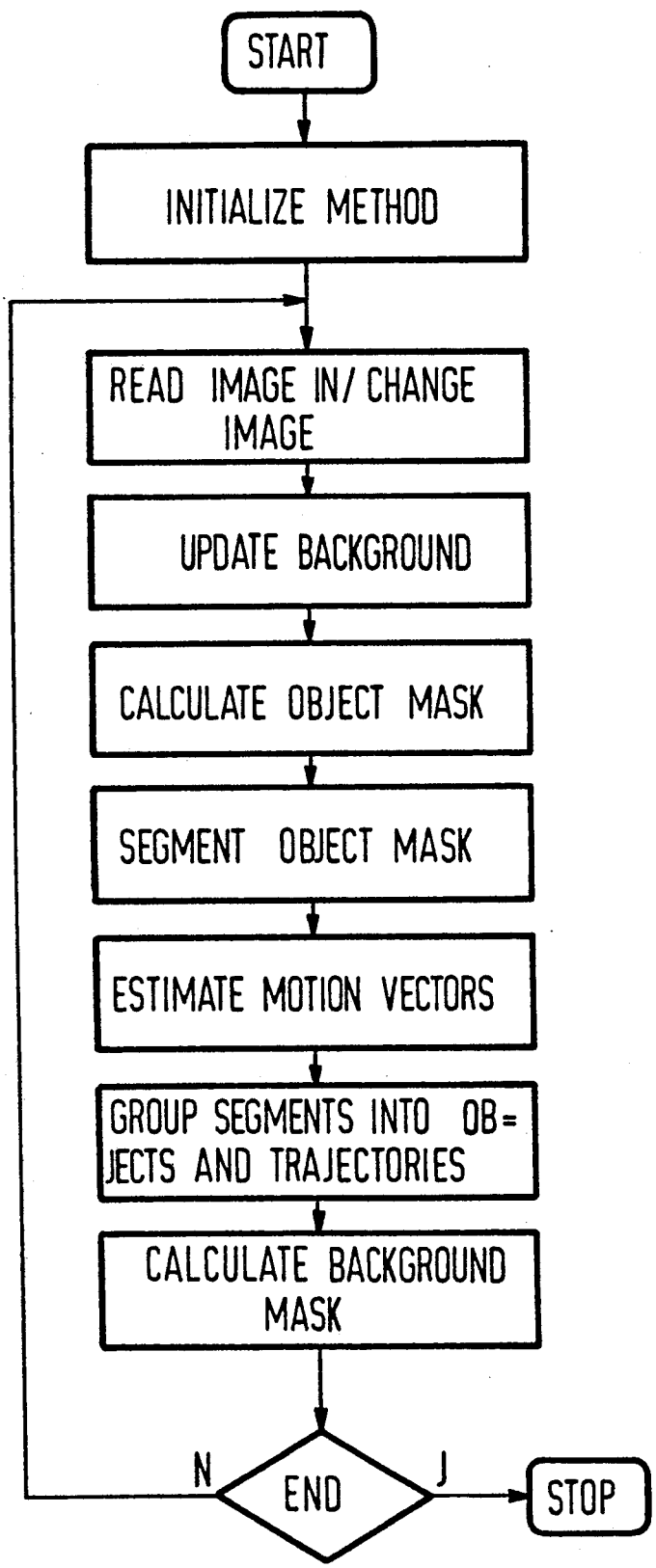
FIG. 1 is a flow chart of the method of the present invention.

The method of the present invention calculates a sequence of background images $B_k$ (dynamic background memory) from the image sequence $I_k$. All rapidly varying dynamic movements are suppressed in the background memory. Slowly sequencing movements and all static image contents of the original sequences, however, are visible without modification in the background sequence.

Assuming that the objects to be tracked produce brightness changes due to their motion, the brightness changes varying rapidly as compared to illumination changes or changes in surface reflectivity due to meteorological influences, for example, the moving objects can be separated from stationary objects and other areas of slow brightness changes by subtracting the background sequence from the original image sequence.

By applying a suitable threshold to the corresponding difference image sequence $(D_k) = (I_k - B_k)$ (see FIG. 2), a binary sequence of object masks $(M_k)$ is produced that initially still may contain noisy pixels. These noisy pixels, however, can be eliminated by appropriate filtering. These object masks differ from the "frame difference" masks acquired from difference images of consecutive images of the original sequence on the basis of the following properties:

(1) Under ideal conditions (complete freedom from noise and adquate contrast between the objects and the background), the segments of the object masks $(M_k)$ correspond to the actual positions and shapes of the moving objects. In particular, the shape of the segments is not dependent on the velocity of the objects, as is the case for "frame difference" masks.

(2) Even a completely uniform object is correctly identified in terms of position and shape when the brightness difference of the object to the background is great compared to other brightness changes, such as those caused by rapid movements.

The critical disadvantages of the "frame difference" masks are thus avoided. At the same time, object masks produced with background memories are ideally suited for estimating the motion parameters of the objects to be tracked. Since their segments reflect the position and shape of the moving objects in a good approximation, they can be interpreted as segments of the motion vector field. The motion vector field is approximately constant in its interior when the objects are predominantly moved translationally, that is when the objects are not rotated to any great extent.

After the calculation of the object mask, the segmentation of the binary object masks $(M_k)$ occurs in a next step, see FIG. 1, whereby the sizes and centers of gravity positions of all segments are calculated at the same time. Their values are interpreted as measurable variables for a linear Kalman filter by which the momentary estimated values including the co-variance thereof are calculated for the segments from earlier quantities, center of gravity positions and velocities of the segments. By minimizing the estimated error co-variance, the correct allocation of the segments of consecutive object masks is found (herein referred to as the correspondence problem).

Proceeding from the estimated values of the Kalman filter, the exact calculation of the motion vectors is then possible by matching the gray scale values within the mask segments. The associated function need only be evaluated in a small environment of the estimated value for every motion vector.

When the correspondence problem has been solved and when the motion vectors and their correct allocations to the segments of the object mask are known, the correct grouping (see FIG. 1) of the segments into objects and their tracking presents no further problems.

The ongoing images of the sequence $I_k$ are used for calculating the dynamic background memory $B_k$ on the basis of spatially selective averaging over the time k. In order to take into account that brightness and contrast fluctuations due to meteorological influences frequently occur in outdoor exposures and that these should not lead to a deviation of the momentarily visible background from the stored background image, the averaging is carried out by the following recursion equation:

$$B_k(p):=(1-a_{k-1}(p))\overline{B}_{k-1}(p)+a_{k-1}(p)I_{k-1}(p) \quad (1)$$

wherein the auxiliary quantity (background prediction)

$$\overline{B}_k(p):=B_k(p)+\gamma(B_k(p)-B_{k-1}(p)) \quad (2)$$

The term p refers to the coordinates of a point in the image plane. The quantity $\gamma$ is a weighting factor between 0.0 and 1.0. When $\gamma=0$ is selected, then $\overline{B}_k=B_k$ applies and equation (1) is simply a recursive equation for averaging over $I_k(p)$. When $\gamma$ is not equal to 0 (typically, $\gamma=0.7$), the difference of the last two background images, $B_{k-1}$ and $B_{k-2}$, from the background prediction is then additionally used, so that a gradual brightening or darkening of a picture element due to meteorological influences (for example, clouds) cannot produce a deviation between the current and stored background. As may be seen from equation (2), the storing of two images, namely $B_{k-1}$ and $B_{k-2}$ (or of $B_{k-1}$ and the difference $\Delta_{k-1}=B_{k-1}-B_{k-2}$) is required in this case.

The binary image sequence $\{a_k(p)\}$, referred to below as a background mask, serves the purpose of blanking the image regions recognized as moving out of the sequence of gray scale value images $\{I_k\}$. Its calculation assumes an optimally good knowledge of the position and shape of all moving objects at the respective points in time and therefore occurs in the last method step for every point in time k (see FIG. 1).

The background mask has the following properties:

$$a_k(p) \begin{cases} = \alpha & \text{when } p \text{ belongs to the mask of a moving object,} \\ = \beta & \text{for all other situations.} \end{cases} \quad (3)$$

The numbers $\alpha$ and $\beta$ are selected in view of the typical time scales of the dynamic movements to be separated. $\alpha$ is selected so small that the moving objects are just barely no longer visible in the background. However, it must be large enough to ensure sufficient adaptivity of the background. The maximum value of $\beta$ is likewise defined by the need for an effective noise suppression. However, $\beta$ cannot be selected excessively small because then the updating of the background with the ongoing images would not occur to an adequate degree. The separation of the moving objects from the slowly variable background improves when the respective limits for the two numbers are further apart, i.e. the greater the time scales of the slow and fast changes differ from one another.

When (for example during the first images) there is no information available concerning the position and shape of the moving objects or when the background is also completely unknown (likewise in the initialization phase), $a_k(p)=\beta$ is selected for all values p. As a result the convergence of the equation (1) is accelerated when the estimated background still deviates too greatly from the actual background.

For detecting the moving objects in the original image sequence, the binary object masks $$M_k(p): = \begin{cases} 1 & \text{if } D_k(p) > \text{mindif} \\ 0 & \text{for all other cases} \end{cases} \quad (4)$$

are calculated in this method step, whereby $D_k(p):=I_k(p)-B_k(p)$ is the difference image of the ongoing gray scale value image compared to the estimated background. The difference images defined in this manner are fundamentally different from the differences between typical neighboring gray scale value images. In case the difference between the gray scales values of the objects and those parts of the background covered by them is greater than the brightness fluctuations caused by the noise, there is a value for mindif in equation (4) with which the separation of the objects from the background can be successfully carried out. In this case, the object mask $M_k(p)$ is composed of a set of object segments $\{S_{k,m}\}$ isolated from each other, whose centers of gravity and sizes can be easily calculated. Let them be referred to below as $\{X_{k,m}\}$ and $\{g_{k,m}\}$, respectively.

The object masks defined in equation (4) generally still contain contributions from various noise sources. These noise pixels can be most simply distinguished from the actual object segments on the basis of their size. The noise can therefore be eliminated by quenching those segments whose size does not reach the threshold "minsize", see FIG. 2. The elimination of the noise pixels can be executed in parallel to the segmenting of the object mask.

The background mask $a_k(p)$ required for the calculation of the next background image $B_{k+1}(p)$ is calculated from the object mask $M_k(p)$ according to $$a_k(p):=\alpha M_k(p)+\beta(1-M_k(p)) \quad (5)$$

What is essential concerning the criteria for calculating the coefficients has already been stated in regards to equation (1). The spatial selectivity of the background mask is particularly disturbing during the initialization phase of the method and can be most simply suppressed by selecting a corresponding high value for "mindif" during this phase, see FIG. 2.

Two consecutive object masks $M_k(p)$ and $M_{k-1}(p)$ differ mainly in the position of the object segments and their size. Usually, the segments only change slowly in time. The center of gravity differences of corresponding segments are $$d_{k,m,n} = x_{k,m} - x_{k-1,n} \tag{6}$$

and can be used as start values for the subsequent calculation of the motion vectors and can be calculated in a simple manner from the set of centers of gravity $\{x_{k,m}\}$ and $\{x_{k-1,n}\}$.

The start vectors are now improved with the actual motion estimate by matching the gray scales values belonging to the segments of the object mask. For example, this occurs by minimizing $$K_{ij,k}(v) = \frac{\sum_p S(p+v,k) S(p,k-1) |I(p+v,k) - I(p,k-1)|^2}{\sum_p S(p+v,k) S(p,k-1)} \tag{7}$$

Minimizing of $K_{ij,k}(v)$ is best performed by simples evaluation of the function for all $v$ from a suitably selected neighbourhood of the start vector $d_{k,ij}$. Since the start vector is already a good approximation for the exact motion vector (in case there is an object having this motion vector at all), this neighbourhood can be selected correspondingly small. Local minimization methods (for example, Newton or gradient methods) lead to unreliable results since the function generally has a great number of local minima. The vector $v_{ij}$ for which this sum assumes its minimum is the motion vector belonging to the segment pair (i,j).

The advantage of the method for motion estimating set forth herein is that the segments of the object mask used for matching, in contrast to arbitrarily selected blocks, lie completely inside the interior of the object edges. Accordingly, the motion vector field is smooth inside these segments and is even constant in the case of purely translationally moving, rigid bodies. This property of the segments of the object masks $M_k(p)$ allows the application of the especially simple method for motion estimation.

The method is also suitable for application to tracking objects that rotate within the image plane in addition to a purely translational motion.

In the general case of a plurality of objects moving independently of one another, the correct allocation of the segments among consecutive object masks can be a difficult problem. Objects can disappear beyond the image edges or can disappear in the interior of the image. Also they can cover one another or can be covered by resting objects that were previously included in the background. The number of segments that belong to an object can vary in time. Thus, every segment need not have a successor or a predecessor; however, there can also be more than one predecessor or successor for a segment.

This problem is known as the correspondence problem in the literature and there are various proposals for solving it. In the methods set forth here, the known theory of Kalman filters is utilized for solving this problem. The application of the Kalman theory assumes a linear system model and a linear measuring model in a defined form. It shall therefore be assumed that specific properties of the segments of the object masks such as, for example, center of gravity positions, motion vectors, segment sizes, etc., have their temporal development described by the linear system $$x_1(k) := x_1(k-1) + v_1(k-1) \tag{8a}$$

$$v_1(k) := v_1(k-1) + w \tag{8b}$$

$$G_1(k) := G_1(k-1) + \Theta \tag{8c}$$

$$N(k) := N(k-1) + \eta \tag{8d}$$

where $x_1$, $v_1$ reference the center of gravity or, respectively, the motion vector of the segment 1, $G_1(k)$, which is the size (number of pixels) of the segment 1 at time k, and N(k) references the number of segments in the object mask ($M_k$). The system noise quantities $W, \theta$ and $\eta$ in equation (8a-8d) model the anticipated fluctuation range of the state variables that are assumed to be constant on the average, see L. Lewis, Optimal Estimation, Wiley 1986.

Numerous modifications of the system model are conceivable wherein other state variables (for example, shape factors, acceleration vectors, etc.) are used instead of some segment properties (such as, for example, size or number of the segments) or in addition to them. In any case, the Kalman theory specifies an optimum linear filter for the prediction of the state variables before and after their measurement. With a suitable selection of the statistically properties (co-variance matrices) of the model noise quantities and of the measurement model, assumptions, for example about the anticipated kinematic behavior of the moving objects to be tracked, can thereby be considered in a known manner for the prediction of the center of gravity positions and motion vectors. The calculation of the start values for the motion estimation according to equation (7) is thus improved.

In an expansion of the standard application of Kalman filters, the problem of allocating segments in object masks to adjacent points in time can be solved by using a separate measurement model for every possible allocation. The co-variance matrix of prediction errors is then updated for all of these measurement models. The allocation of the segments that has the fewest prediction error variance will generally be the correct allocation of the segments among consecutive masks.

For solving the described problems, the method of the present invention assumes that a sequence of binary object masks is calculated whose segments reproduce shapes and positions of the moving objects, whereby the motion vectors of the moving objects are calculated by matching these segments. Moreover, a sequence of background images is calculated by computing a spatially selective and time recursive average of the input image sequence in which the moving objects are not contained but in which other modifications of the background that are not caused by moving objects are contained. Further, a sequence of binary object masks is calculated by binarization, that is converting to binary form, the difference image sequence from the input image sequence and the background image sequence. This is calculated using a threshold and the values thereof are used for controlling the spatial selectivity in the calculation of the background image sequence and the segments thereof are identified together with their sizes and center of gravity positions. Finally, the motion vectors of the detected objects are defined by minimizing the squared gray scale value differences averaged over the intersection of the shifted mask segments, whereby the differences between the center of gravity vectors of corresponding segments are utilized as start vector in the minimization.

The required noise suppression in the object masks is preferably implemented by applying median filters.

Instead of the squared gray scale value differences, some other measure for the deviation of the gray scale values of two images at a defined location can be used in the function for motion estimating.

It is also provided in the present invention that a suitably selected constant is added to the counter which is provided in the function for the motion estimating. The prediction of the start vectors for the motion estimating preferably is provided by using a Kalman filter.

A corresponding measurement model (Kalman filter) is used for every possible allocation of the segments among neighboring object masks. The selection of the correct allocation is undertaken via the evaluation of the co-variance matrices of the prediction errors, whereby that allocation is preferably selected that minimizes a suitably selected norm of the co-variance matrices of the prediction errors.

In the present invention, it is preferred that not only one but two background images be stored in a background memory. Alternatively, a background image and the difference between two background images or a plurality of background images can be stored. A suitable recursion equation based on the stored image is used for calculating the background images, this recursion equation ensuring that gradual brightness and contrast changes do not result in any deviation between the current and the stored background image.

It is provided that the required evaluation weightings $\alpha$, $\beta$ and $\gamma$ are adaptively matched to the momentary image signal statistics in a location-dependent and time-dependent fashion, for example with Kalman filters or with the known "least mean squares (LMS)" algorithm.

Finally, it can be inventively provided that the moving object masks are acquired from the difference between the measured image and background image in a simplified fashion, namely, for example, without a comparison of the intensity values within the moving object masks of successive images and without the calculation of motion vectors.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. Method for detecting and tracking moving objects in a digital input image sequence having a substantially stationary background by comparing the input image sequence to at least one calculated background image sequence, comprising:

calculating a sequence of binary object masks by binarization of a sequence of difference images formed from the input image sequence and the calculated background image sequence using a threshold, the sequence of the object masks representing shapes and positions of moving objects;

using said sequence of binary object masks for controlling spatial selectivity in a calculation of said background image sequence;

determining sizes and positions of centers of gravity of segments of said binary object masks; and determining motion vectors of detected objects by minimization of squared gray scale value differences averaged over intersections of shifted mask segments.

2. The method according to claim 1, wherein noise suppression is carried out in the object masks by using median filters.

3. The method according to claim 1, wherein initial motion vectors, predicted by Kalman filters, are used for carrying out the minimization.

4. The method according to claim 1, wherein two or more images of the background are stored in a background memory, or one image of the background and a difference between two images of the background are stored in the background memory and wherein a recursion equation based on the stored images is used for calculating the images of the background, which produce the result that gradual brightness and contrast changes do not cause any deviation between a current image of the background and a stored image of the background.

* * * * *